United States Patent [19]
Cho et al.

[11] Patent Number: 5,771,932
[45] Date of Patent: Jun. 30, 1998

[54] PRESSURE CONTROL VALVE FOR A POWER STEERING APPARATUS

[75] Inventors: Sung Hyun Cho, Seoul; Byeoung Cho Lee, Guri; Je Tae Yoo; Dae Jong Jeong, both of Seoul, all of Rep. of Korea

[73] Assignee: Mando Machinery Corporation, Gunpo, Rep. of Korea

[21] Appl. No.: 550,568

[22] Filed: Oct. 31, 1995

[30] Foreign Application Priority Data

Nov. 5, 1994 [KR] Rep. of Korea .................. 1994-29003

[51] Int. Cl.$^6$ ........................................... F15B 13/04
[52] U.S. Cl. ........................... 137/625.69; 137/625.68
[58] Field of Search ............................. 251/30.01, 30.02; 137/625.69, 625.68, 625.67, 596, 625.25

[56] References Cited

U.S. PATENT DOCUMENTS

| | | |
|---|---|---|
| 2,530,377 | 11/1950 | Chattler ................................ 137/625.68 |
| 2,968,316 | 1/1961 | Schultz ..................................... 137/596 |
| 4,784,235 | 11/1988 | Ijiri et al. . |
| 5,617,895 | 4/1997 | Pfuhl et al. ......................... 137/625.69 |

*Primary Examiner*—Kevin Lee
*Attorney, Agent, or Firm*—Armstrong, Westerman, Hattori, McLeland & Naughton

[57] ABSTRACT

A pressure control valve for a power steering apparatus comprises a pin extending along the movement of a spool and contacting on a solenoid with one end of the pin, a bore provided slidably in the spool and having a longer length than the pin, a first annular groove communicated with an oil passage change valve, and a second annular groove communicated with a reaction chamber as well as the first groove, and the second groove communicating with the bore.

6 Claims, 6 Drawing Sheets

PRESSURE CONTROL VALVE FOR A POWER STEERING APPARATUS

FIELD OF THE INVENTION

The invention relates to a pressure control valve for a power steering apparatus, and more particularly, to a pressure control valve in which a spool provides a slidable bore for reception of a pin mounted on the solenoid, and the bore is communicated with the exterior of the spool.

DESCRIPTION OF THE PRIOR ART

In case of a heavily loaded vehicle or a passenger car with a low tire pressure, a contact resistance of the respective front tires with the road is increased and a steering force of the steering wheel is increased, without being able to maintain rapid steering control. Therefore, for supporting the lighter and more rapid steering, a power steering apparatus, which has a power mechanism installed additionally to a conventional steering device, is employed. With less steering force, a convenient steering gear ratio can be accomplished easily. Also, kick-back of a steering wheel in respect with shock transferred from the road can be prevented. Further, a shimmy motion of the front tires can be reduced and thus the stability of the driving is increased.

The power steering apparatus, conventionally, is comprised of an oil passage change valve, a power cylinder, an oil pump and a pressure control valve. In FIGS. 5 and 6, the oil passage change valve 60 provides a torsion bar 64 located between an input shaft 62 connected to a steering wheel 61 and an output shaft 63 connected to a power cylinder (not shown). A rotary valve 65 rotating about the axis of the torsion bar 64 is provided at the external portion of the torsion bar 64, with both being provided in a housing 66. Further, the housing 66 has a reaction chamber 67 communicated with a pressure control valve 50. The pressure control valve 50 comprises a proportional solenoid 52 acting in proportion to the electric current generated from an electronic control unit 51 and a spool 54 which is slidably moved in the housing 53 with the action of the proportional solenoid 52. The pressure control valve 50 further comprises a spring 55 located opposite of the solenoid 52 for supporting the movement of the spool 54 and predetermining the initial movement position of the spool 54, a spring cap 56 for restricting the spring 55 and a fixed orifice 58 for not only transferring the controlled oil pressure in the housing 53 to the reaction chamber 67 through an oil passage 57, but for eliminating the slightest vibration.

When the input shaft 62 is rotated by the turning of the steering wheel 61, the rotational degree difference is induced between shafts 62,63 according to the torsion bar 64. With the degree difference the oil passage change valve 60 starts to operate to stack the main pressure. The operating oil having the main pressure flows into the housing 53 of the pressure control valve 50 through an oil passage 59. The operating oil passes a variable orifice 72, which is formed between the interior of the housing 53 and a first annular rib 71 of the spool 54 so that the pressure is lowered, which is exerted as the initial valve pressure. As an annular groove 74 formed between the first annular rib 71 and the second annular rib 73 is filled with the oil, the oil also fills an annular groove 77 formed between the first annular rib 71 and the third annular rib 76. The oil in the groove 77 pushes the spool 54 toward the spring 55, because the diameter De of the first rib 71 is larger than the diameter Ds of the third rib 76. The vehicle speed detected by a vehicle speed sensor 81 is transferred to the electronic control unit 51 and the varied electric current, i.e. the high electric current at the low speed or the low electric current at the high speed, is applied to the solenoid 52. Depending on the magnitude of the electric current, the force of the solenoid 52, which is described as the pushing amount of the spool 54 against the spring 55, can be determined. When at low speed, the magnitude which combines the force of the solenoid 52 applied by the high electric current and the pressure in the groove 77, overcomes the elastic force of the spring 55 so as to push the spool 54 in the arrow "E" direction. The opening degree of the variable orifice 72 is decreased and the oil volume passed into the groove 77 is reduced. Hence, the reaction pressure applied to the reaction chamber 67 through the oil passage 57 is diminished. On the contrary, when at high speed, the elastic force of the spring 55 overcomes the magnitude,which combines the force of the solenoid 52 applied with the low electric current and the pressure in the groove 77 so as to push the spool 54 in the arrow "S" direction.

The opening degree of the variable orifice 72 is increased and the oil volume passed into the groove 77 is enlarged. Hence, the reaction pressure applied to the reaction chamber 67 through the oil passage 57 is heightened.

Besides, the sudden exterior effect inputted from a road when a vehicle using the system is running, increases the main or system pressure instantaneously. As the main pressure is increased, the spool 54 is moved in the arrow "E" direction owing to the imbalance of the pressure in the groove 77. Thus, the opening degree of the variable orifice 77 is lowered and that leads to the decrease of the pressure of the groove 77. Thereafter, the spring force is larger than the force exhibited by the imbalance of the pressure, and the spool 54 is moved in the arrow "S" direction. In this way, the spool is moved in the arrow "E" or "S" directions and the pressure of the reaction chamber 67 can be controlled by only the force of the solenoid, which is irrelevant to the increase of the main pressure.

As a result, the reaction pressure according to the pressure control valve is determined so that the driver can be allowed to have a more comfortable steering feeling.

However, since respective diameters Ds,De of the bore containing the spool 54 are different, the inner diameters in the housing 53 must be formed in different sizes to form the step. During the movement of the spool 54, the step is worn out to weaken the sealability between the annular ribs, causing a loss of reliability due to the resultant leakage.

To solve the problem, the inner diameter of the housing formed in a constant size across the entire longitudinal portion of the spool having the complementary size is disclosed in U.S. Pat. No. 4,784,235. This patent provides a main spool in a housing having a constant diameter and a sub-spool engaged in the main spool. Further, the sub-spool is slidingly mounted on a plunger. Still, since many slidable contact portions, i.e. between the outer diameter portion and the inner diameter portion of the main spool and the inner diameter portion of the sub-spool, are exhibited in the structure, the possibility of wear on the spools may be induced. Moreover, the burden of the fitness control of the respective components, due to the increased number of components, is presented.

SUMMARY OF THE INVENTION

It is, accordingly, an object of this invention to provide a pressure control valve for a power steering apparatus capable of increasing the sealability of the housing against the leakage of operation oil with a decrease of the slidable contact portion having the spool.

It is a further object of this invention to provide a pressure control valve for a power steering apparatus capable of improving the reliability of the easy fitness control in an assembly of fewer components.

In accordance with the present invention, the pressure control valve for a power steeling apparatus comprises

DESCRIPTION OF PREFERRED EMBODIMENT

Figure 1:
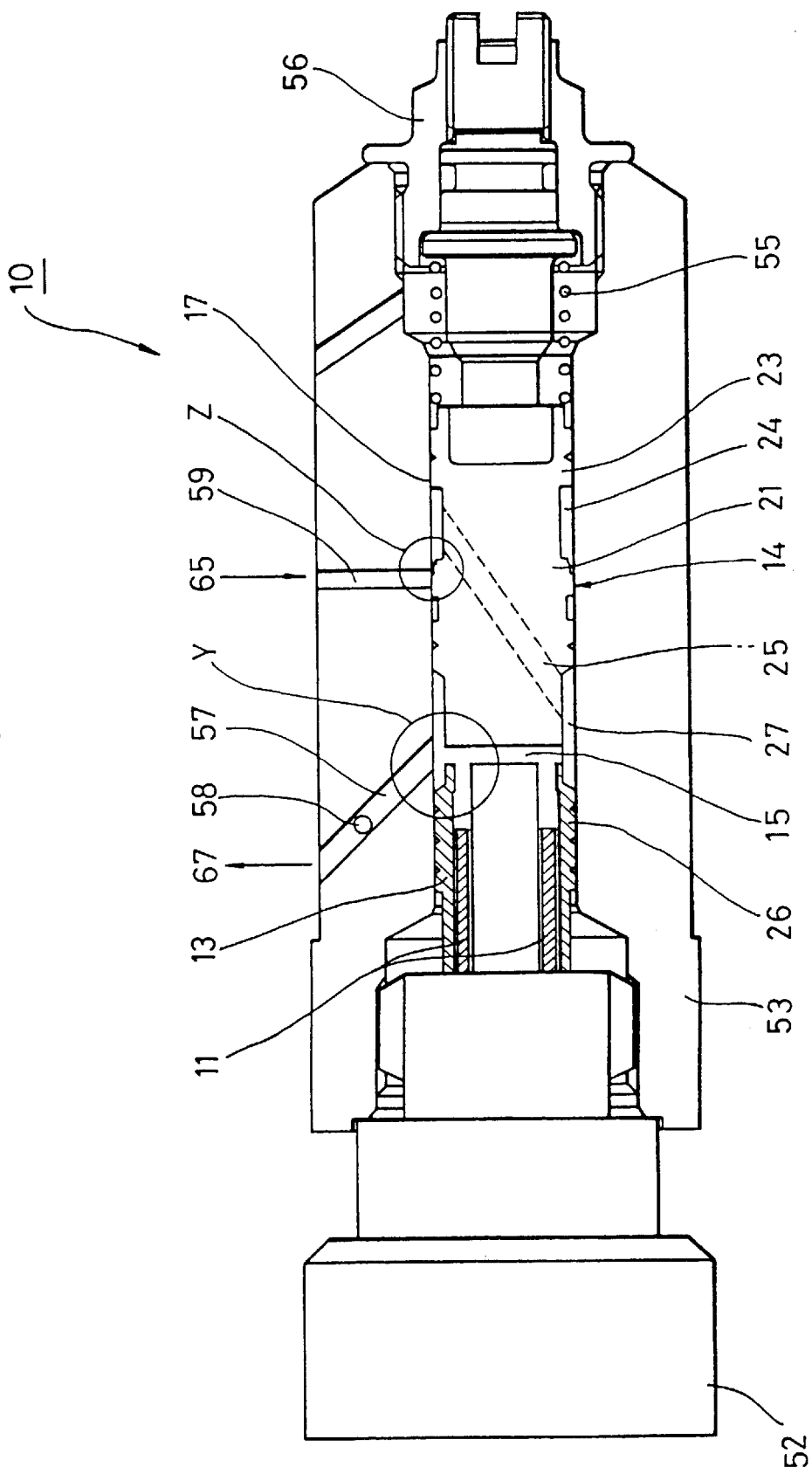
FIG. 1 is a portional sectional view of the pressure control valve according to the present invention.
Figure 5:
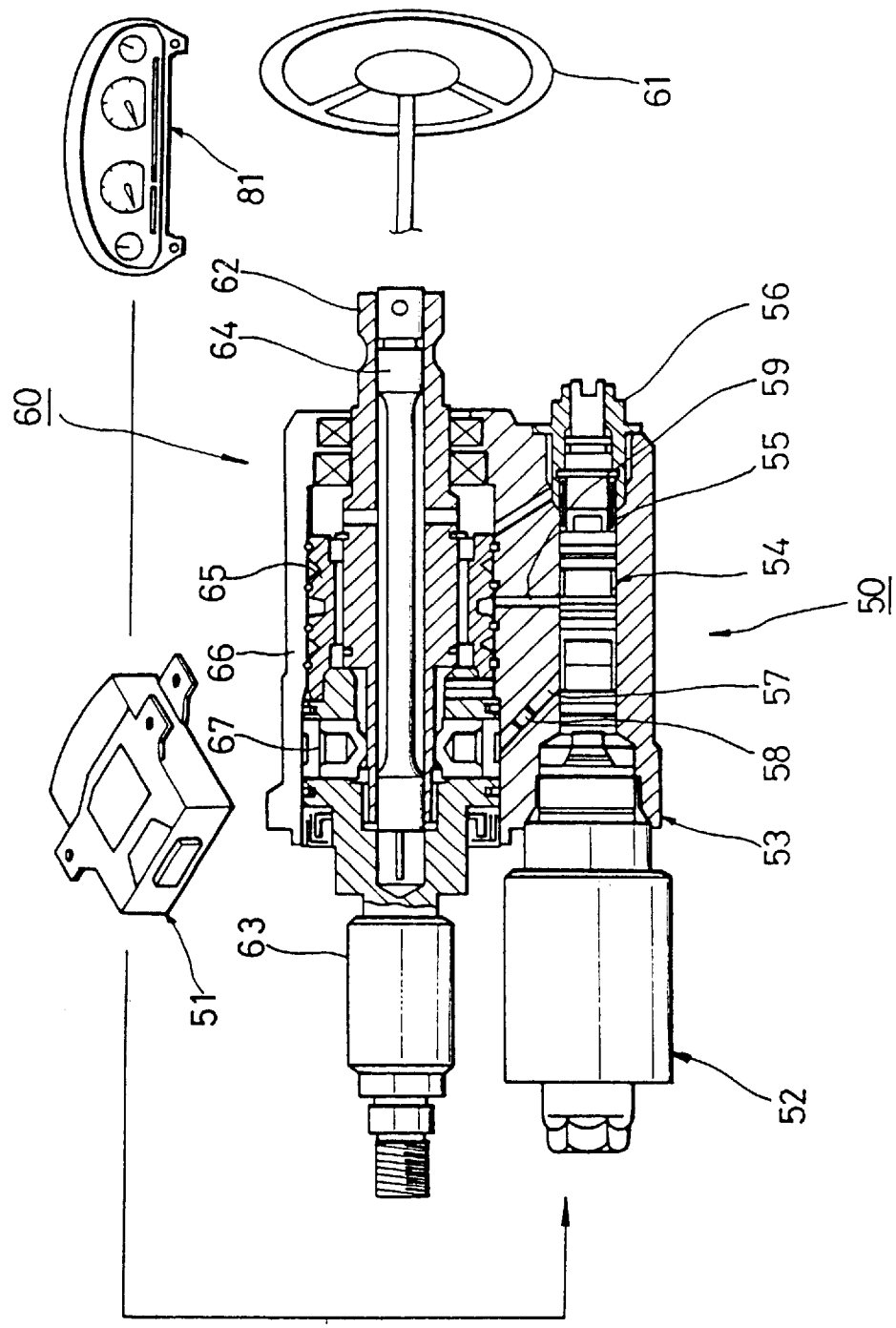
FIG. 5 is a portional sectional view of the oil passage change valve and the pressure control valve and a connection view illustrating the operation therebetween according to a prior art.
Figure 6:
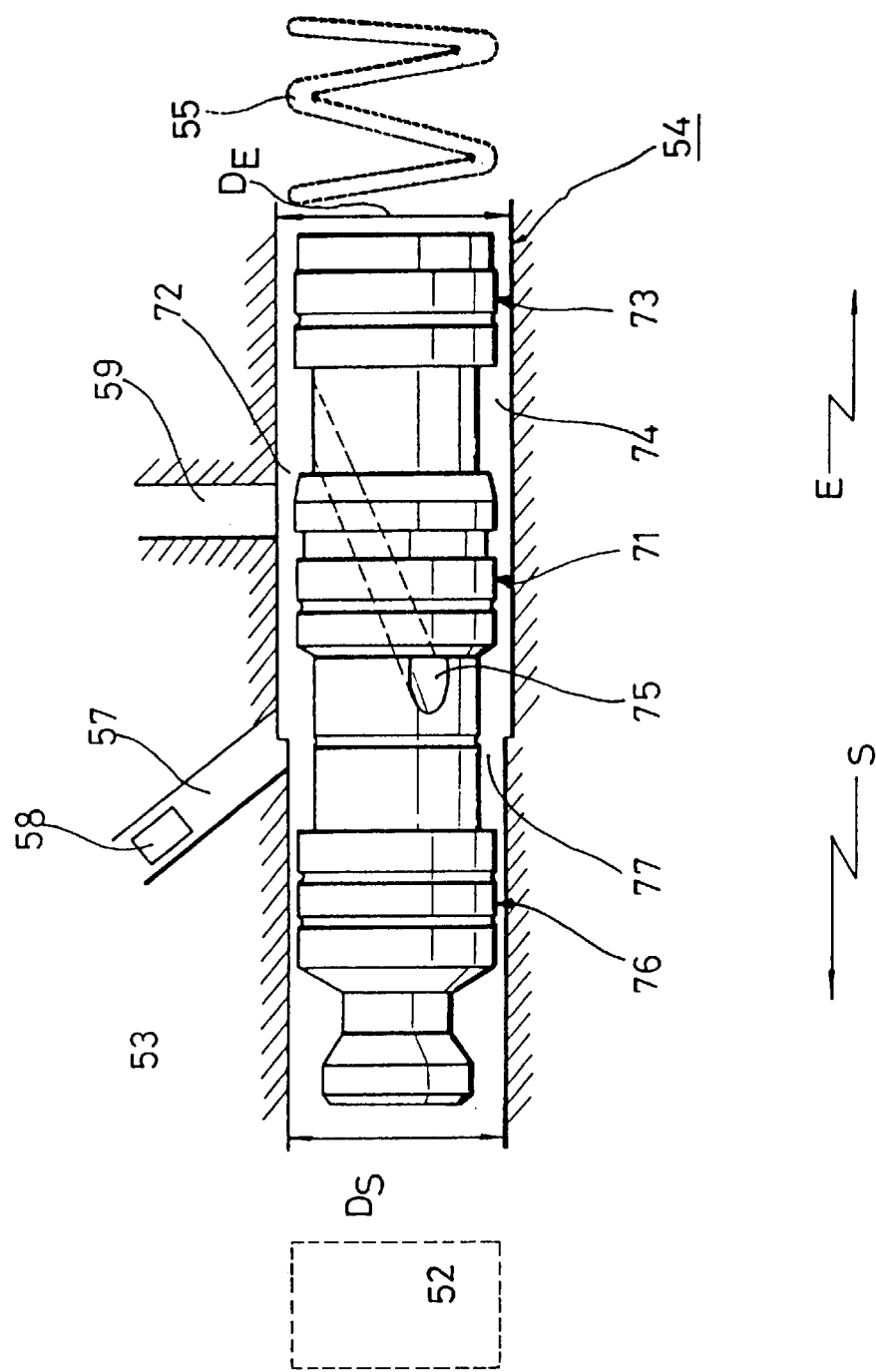
FIG. 6 is a perspective view of the spool in the portional section of the housing of FIG. 5.

FIG. 1 shows the pressure control valve 10 of the present invention which is adapted for connection to an oil pressure change valve 60, as shown in FIG. 5, similar to that of the pressure control valve 50 shown in such drawing FIG. Hereafter, the same components as the prior art are designated by the same numeral. Thus, no detailed explanation of the same components will be provided.

The pressure control valve 10 comprises a housing 52 having a bore defining an inner diameter portion 17 formed with a constant diameter and a spool 14 slidably provided in the inner diameter portion 17. At the exterior of the spool 14 a first, second and third annular ribs 21,23,26, which are in a same axis and of a same diameter, are provided. The first annular groove 24 communicated with the first oil passage 59 is located between the first rib 21 and the second rib 23, whilst the second annular groove 27 communicated with the second oil passage 57 is located between the first rib 21 and the third rib 26. An oil passage 25 is provided in the spool 14 for communicating the first groove 24 and the second groove 27. Further, an oil passage 15 extends traversely across the spool 14 for communicating the parts of the second annular groove 27. A plurality of bores 13 are provided in the spool 14 extending parallel to the movement of the spool 14, one end of which is communicated with the oil passage 15 and another end of which is extended to the solenoid 52. A pin 11 is inserted in each of the respective bores 13 for guiding the spool 14 in its movement. One end of the respective pins 11 is fixed to the solenoid 52 in the present embodiment, but in a modifying embodiment, a contact of the pin to the solenoid, can be employed.

The length of the pins 11 is shorter than that of the bores 13, and, when the end of the spool adjacent to the solenoid 52 is contacted to the solenoid 52, the portion of the bore 13 opposite to the one end is formed as a space 19.

The valve 10 having the construction as described above, is operated as follows.

At low speed, the proportional solenoid 52 is applied with a high electric current (FIG. 4, Ix) and the spool 14 is pushed toward the spring 55. Thus, the opening degree of the variable orifice 22 (FIG. 3) is decreased and the pressure in the first and the second annular grooves 24,27 is lessened. Hence, the reaction pressure applied to the reaction chamber 67 in the oil passage change valve 60 through the oil passage 57 is lowered. Conversely, at high speed, the proportional solenoid 52 is applied with a low electric current (FIG. 4, In) and the spool 14 is pushed by the spring 55 toward the solenoid 52. Thus, the opening degree of the variable orifice 22 (FIG. 3) is increased and the pressure in the first and the second annular grooves 24,27 is enlarged. Hence, the reaction pressure applied to the reaction chamber 67 through the oil passage 57 is heightened.

Figure 2:
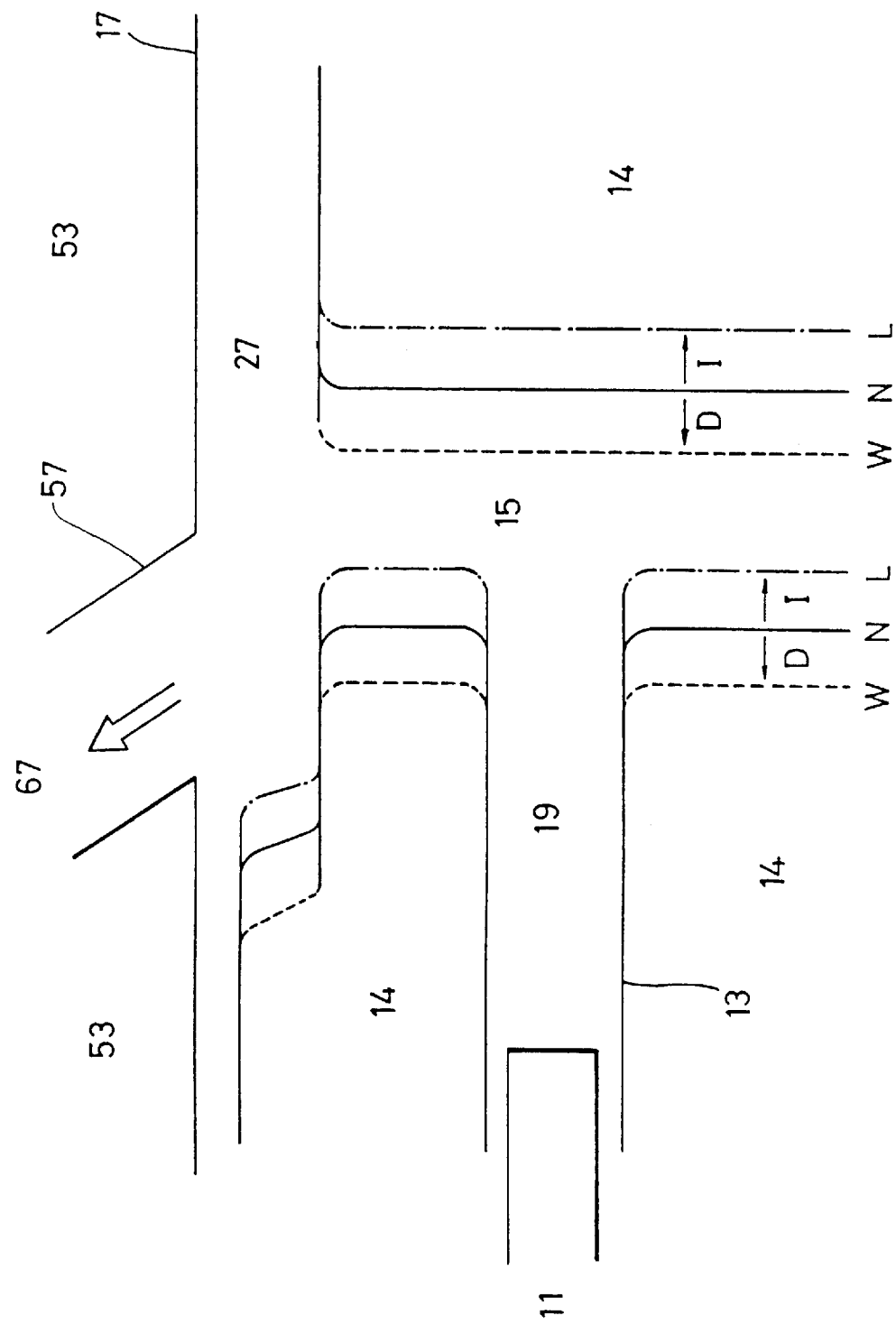
FIG. 2 is an enlarged view of Y portion of FIG. 1.
Figure 3:
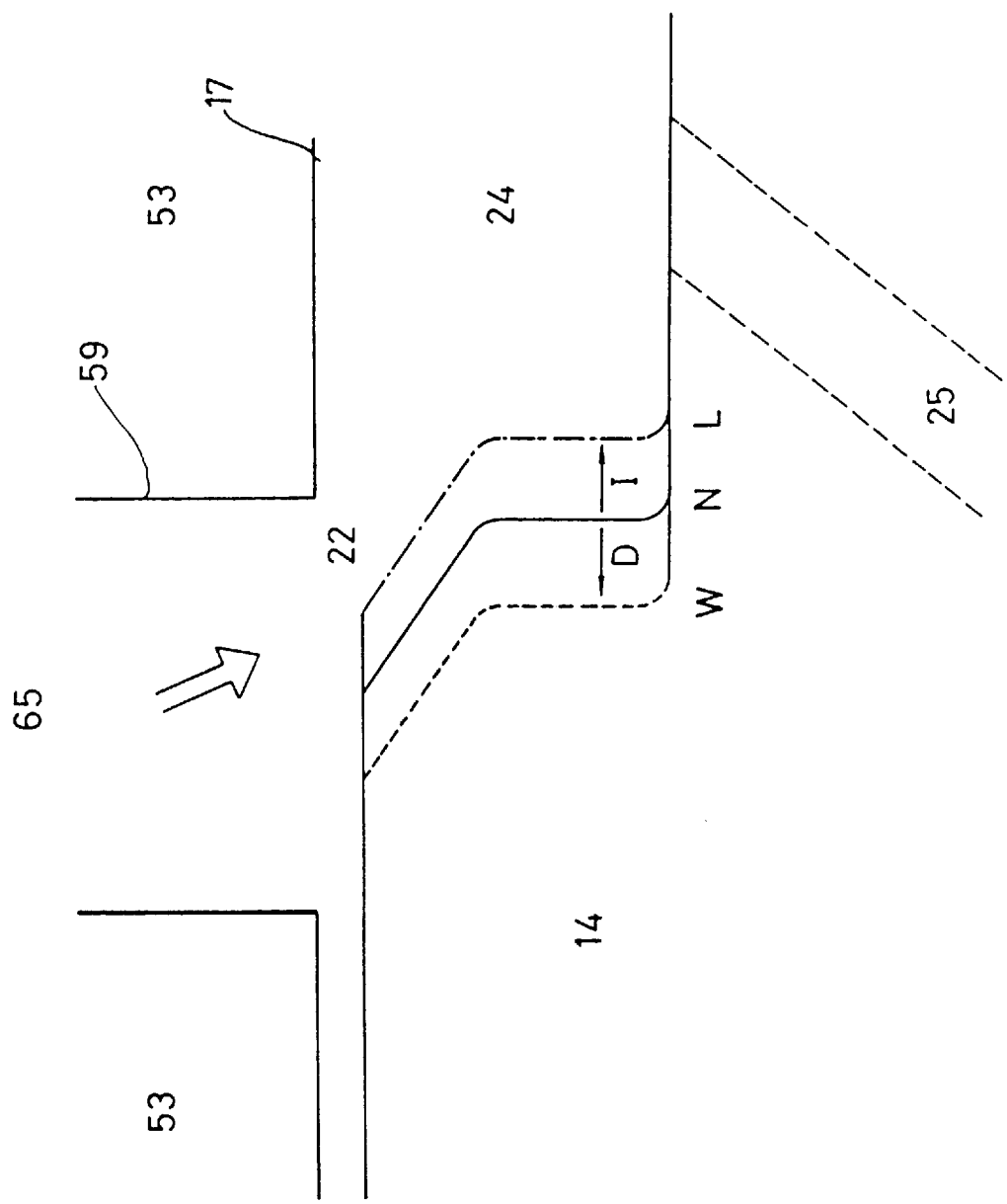
FIG. 3 is an enlarged view of Z portion of FIG. 1.
Figure 4:
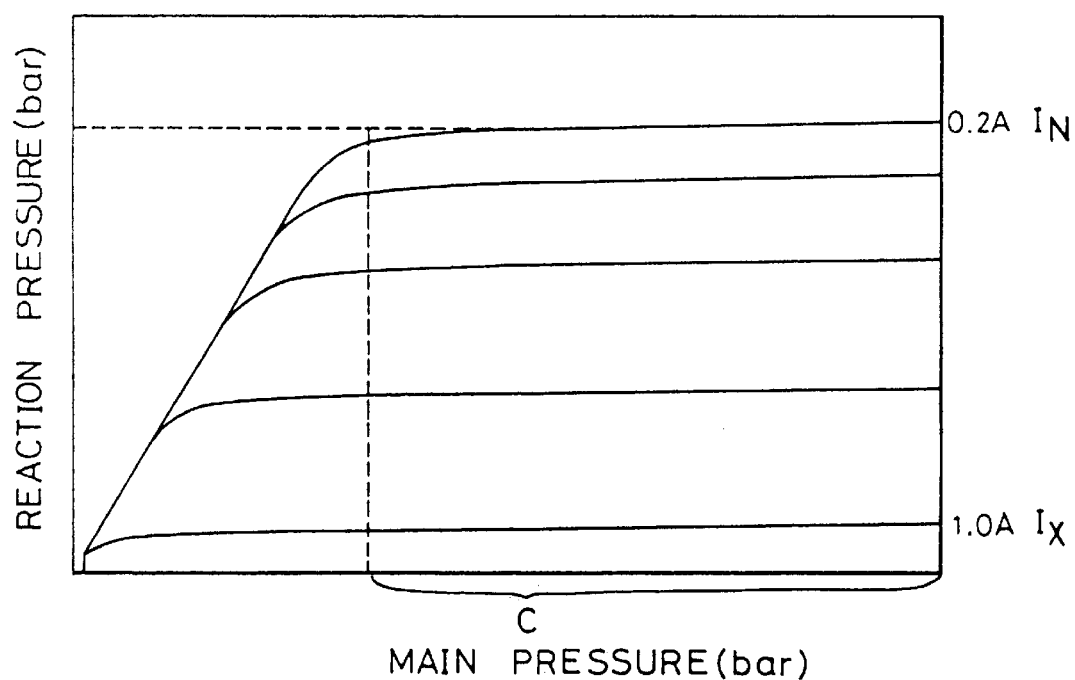
FIG. 4 is a graph showing the relationship between the main pressure of the oil passage change valve and the pressure of the pressure control valve according to the present invention.

And then, when the solenoid is applied with a predetermined current, as well as constant current, i.e. constant speed range (FIG. 4, Range C), the spool 14 is operated in respect to FIGS. 2 and 3.

First, in a certain constant speed the spool 14 remains in the neutral position N shown by a solid line.

Second, at an increase of the main pressure applied to the rotary valve 65, since the oil volume passing the variable orifice 22 is enlarged, the pressure in the first groove 24 is increased and also the pressure in the second groove 27, communicated with the oil passage 25, is increased. The oil having the risen pressure flows into the space 19 in the bore 13 through the oil passage 15. In the space 19, the pressure is applied to the pin 11. Since the pin 11 is fixed to the solenoid 52, the pin 11 remains still. With the counteraction of the pressure, the spool 14 in the N position is moved along the arrow "I" direction and relocated in the L position, shown by a dash and dot line. The opening degree of the variable orifice 22 is decreased and the oil volume passing through the variable orifice 22 is decreased. Thus, the main pressure remains in the status before the increase so that the pressure applied to the reaction chamber 67 is controlled constantly.

Last, in a decrease of the main pressure applied to the rotary valve 65, since the oil volume passing the variable orifice 22 is reduced, the pressure in the first groove 24 is decreased and also the pressure in the second groove 27 communicated with the oil passage 25 is decreased. To confront the reduction of the pressure, the spring 55 pushes the spool 14 in the N position along the arrow "D" direction and the spool relocated is in the W position shown by a broken line. The opening degree of the variable orifice 22 is increased and the oil volume passing through the variable orifice 22 is enlarged. Thus, the main pressure remains in the status before the decrease so that the pressure applied to the reaction chamber 67 is controlled constantly.

The bore 13 is communicated with the second groove 27 in the present embodiment, but the bore 13 can be communicated with the first groove 24 instead of the second groove 27 as another embodiment.

In accordance with the invention, the spool has the annular rib in the coaxial and same diametrical configuration and the housing is formed complementary to the rib of the spool. Thus, even when the speed is changed along the variation of the solenoid current, the sealablity of the oil is ensured owing to the wearing friction between the rib and the housing.

Further, since the bore is provided in the spool having a pin, even when the main pressure is changed with the constant solenoid current, the movement of the spool can be controlled using the space in the bore, thereby handling the variation of the main pressure. Thus, the invention prevents the variation of the main pressure from transferring to the reaction chamber, thereby enabling the reaction pressure to be maintained constant.

What is claimed:

1. An oil pressure control valve of a power steering apparatus comprising:

a housing, and a spool slidingly provided in said housing, said housing providing a first port communicated with an oil passage change valve and a second port communicated with a reaction chamber through a fixed throttle;

said spool providing a first groove communicating with said first port, a second groove communicating with said second port, an oil passage connecting said first and second grooves;

a bore formed in said spool extending in the moving direction of said spool and receiving the oil in said housing, and a pin fixed with respect to said housing and extending into said bore for guiding the movement of said spool.

2. The oil pressure control valve of a power steering apparatus according to claim 1, wherein said housing provides an axially extending inner diameter portion of constant diameter, in which said spool is slidably provided.

3. The oil pressure control valve of a power steering apparatus according to claim 2, wherein said spool includes a plurality of axially spaced annular ribs of substantially uniform diameter defining said first and second grooves.

4. The oil pressure control valve of a power steering apparatus according to claim 1, wherein the length of said pin is shorter than that of said bore.

5. The oil pressure control valve of a power steering apparatus according to claim 4, wherein said bore is communicated with said second groove.

6. The oil pressure control valve of a power steering apparatus according to claim 4, wherein said bore is communicated with said first groove.

* * * * *